(12) United States Patent
Magee et al.

(10) Patent No.: US 9,692,336 B2
(45) Date of Patent: Jun. 27, 2017

(54) ASYNCHRONOUS STATE ESTIMATION AND CONTROL IN A FIELD-ORIENTED CONTROL ARCHITECTURE

(71) Applicant: Texas Instruments Incorporated, Dallas, TX (US)

(72) Inventors: David Patrick Magee, Allen, TX (US); Jorge Zambada, San Diego, CA (US)

(73) Assignee: TEXAS INSTRUMENTS INCOPORATED, Dallas, TX (US)

( * ) Notice: Subject to any disclaimer, the term of this patent is extended or adjusted under 35 U.S.C. 154(b) by 0 days.

(21) Appl. No.: 14/880,008

(22) Filed: Oct. 9, 2015

(65) Prior Publication Data
US 2017/0104430 A1    Apr. 13, 2017

(51) Int. Cl.
*H02P 6/16* (2016.01)
*H02P 21/00* (2016.01)
*H02P 21/14* (2016.01)

(52) U.S. Cl.
CPC .......... *H02P 21/0003* (2013.01); *H02P 21/14* (2013.01); *H02P 21/146* (2013.01)

(58) Field of Classification Search
CPC ........................................................ H02P 6/06
USPC ............................... 318/400.04, 400.01, 700
See application file for complete search history.

(56) References Cited

U.S. PATENT DOCUMENTS

| 7,348,756 B2* | 3/2008 | Ma ...................... H02P 21/0089 318/432 |
| 8,115,428 B2* | 2/2012 | Williams ............. B62D 5/0481 318/400.02 |
| 8,552,670 B2* | 10/2013 | D'Angelo ............... H02P 21/22 318/254.1 |

OTHER PUBLICATIONS

Bae et al., "A Compensation Method for Time Delay of Full-Digital Synchronous Frame Current Regulator of PWM AC Drives", Trans. on Industry Applications, vol. 39, No. 3 (IEEE, 2003), pp. 802-810.
Bodson et al., "A Systematic Approach to Selecting Flux References for Torque Maximization in Induction Motors", Trans. on Control Systems Technology, vol. 3, No. 4 (IEEE, 1995), pp. 388-397.
U.S. Appl. No. 14/337,576, filed Jul. 22, 2014.
U.S. Appl. No. 14/337,595, filed Jul. 22, 2014.
U.S. Appl. No. 14/675,196, filed Mar. 31, 2015.

* cited by examiner

*Primary Examiner* — David S Luo
(74) *Attorney, Agent, or Firm* — John R. Pessetto; Charles A. Brill; Frank D. Cimino (57) ABSTRACT

A motor controller architecture and method of operating the same. The motor controller asynchronously generates multiphase control signals for a multi-phase electric motor, relative to the estimation of various state parameters used in generating those control signals. Latency between the state estimation task and the control signal generation task is addressed by storing a timestamp with each input data sample from the sensors, and maintaining that timestamp with the output data from state estimation. Knowledge of the timestamp value allows the control task to update the state estimates to compensate for the time difference between the input data sample and the current sampling period.

17 Claims, 7 Drawing Sheets

ASYNCHRONOUS STATE ESTIMATION AND CONTROL IN A FIELD-ORIENTED CONTROL ARCHITECTURE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of control systems for electric machines. Embodiments described in this specification are more specifically directed to field-oriented control of electric motors.

Field-oriented control ("FOC") has become commonplace in modern control systems for AC electric motors. According to this approach, stator windings of the AC motor are driven, for example by pulse-width-modulation, in such a way as to maximize the torque/ampere performance of the motor. Field-oriented control of AC motors is a complicated task because the rotation of the magnetic field in the stator with respect to the rotating magnetic field of the rotor can be asynchronous, such that characterization of the operation of the AC motor involves a set of differential equations with time varying coefficients.

Modern high-speed programmable microcontrollers have been widely adopted for carrying out the complex calculations required for accurate field-oriented control. Many AC motor control algorithms are based on the well-known "Park" transform, which transforms the applicable set of differential equations with angle-dependent coefficients into a set of differential equations that are independent of motor angle. In particular, the Park transform considers motor operation according to a rotating two-dimensional (d, q) coordinate system, where axis d is aligned with the field flux linkage component (i.e., the rotor flux) and orthogonal axis q is aligned with the torque component. By separating the field flux linkage and torque components, motor torque can be controlled without affecting the field flux. This decoupling enables the use of techniques such as dynamic torque control and speed control, either of which can employ proportional-and-integral (PI) control algorithms and the like for the actual controller instantiation.

Figure 1A:
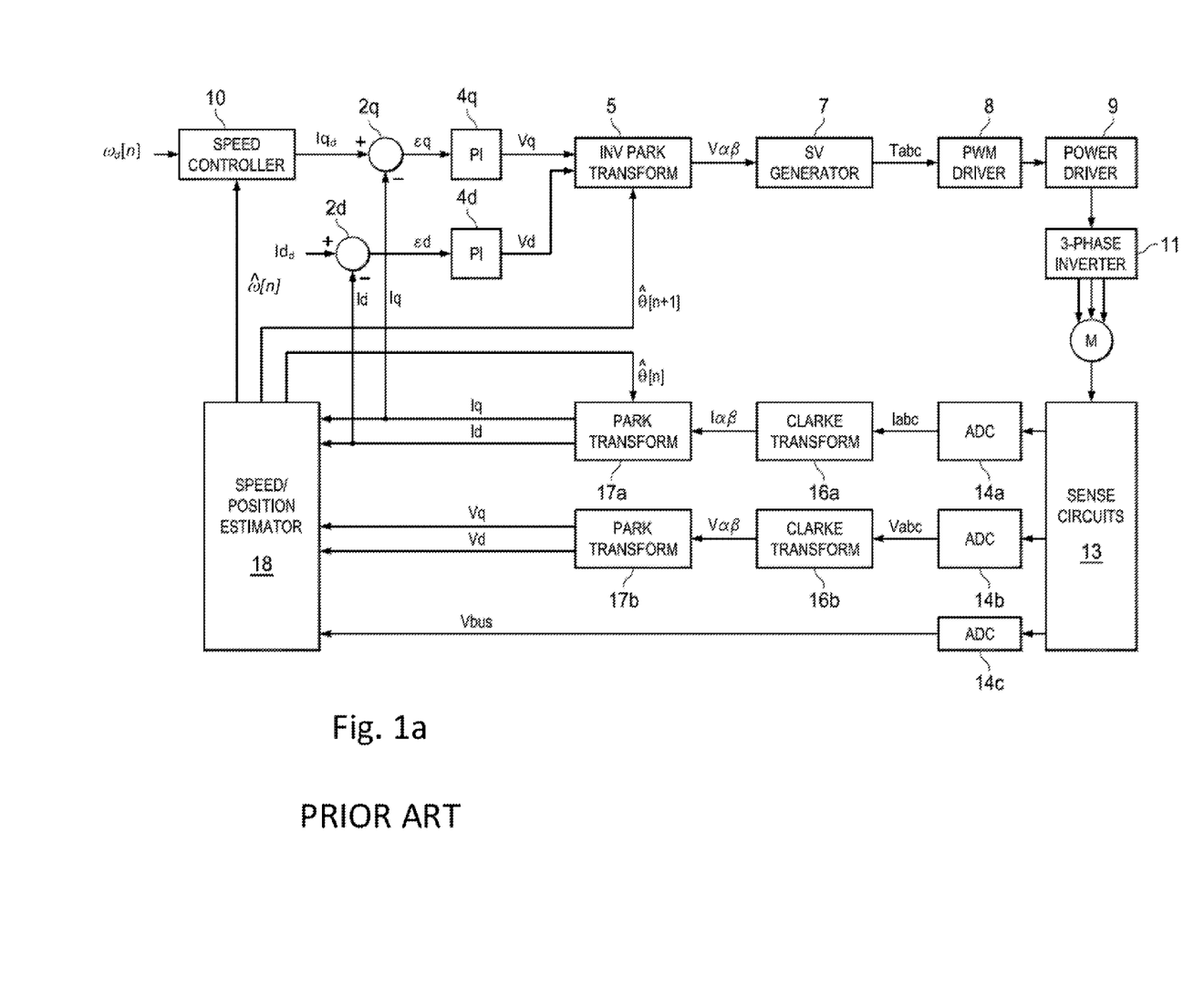
FIG. 1a is a functional block diagram of a conventional motor controller architecture.

FIG. 1a illustrates a conventional FOC controller architecture for controlling the operation of an AC motor. In this architecture, speed controller function 10 is a control function that receives a desired motor speed input signal $\omega_d[n]$ along with a feedback rotor velocity estimate $\hat{\omega}[n]$ from speed/position estimator 18. Speed controller 10 typically applies a function, such as a proportional-integral control function, to a difference (i.e., error signal) between motor speed input signal $\omega_d[n]$ and velocity estimate signal $\hat{\omega}[n]$ to generate the desired quadrature phase reference current signal $Iq_d$ for application to error generator 2q. Error generator 2q subtracts quadrature phase feedback current Iq from quadrature phase reference current signal $Iq_d$, to produce error signal $\epsilon q$ that is applied to proportional-integral (PI) controller 4q. Similarly, error generator 2d receives a desired direct phase reference current $Id_d$ and direct phase feedback current Id, and produces error signal al that is applied to proportional-integral (PI) controller 4d. PI controllers 4q, 4d each apply a conventional control function, for example a combination of proportional and integral functions, to error signals $\epsilon q$, $\epsilon d$, respectively, to produce corresponding respective direct phase control signal Vd and quadrature phase control signal Vq, both of which are applied to inverse Park transform function 5. Inverse Park transform function 5 transforms the d and q phase control signals Vd, Vq to spatially fixed $\alpha$ and $\beta$ phase control signals V$\alpha$, V$\beta$, and applies those signals to space vector generator 7, which in turn produces three-phase data signals Ta, Tb, Tc that express duty cycles (i.e., pulse widths) for corresponding motor phases; these data signals are applied to PWM drivers 8 that generate the pulses applied to the stator windings of motor M via power driver 9 and inverter 11. PWM drivers 8 commonly include timers that control the start and stop times of each drive pulse, in response to data signals Ta, Tb, Tc.

The feedback side of the control loop in this architecture receives feedback signals from multiple sources, all such sources based on sensors at motor M and corresponding sense circuits 13. One source of feedback signals is a set of current sample streams Iabc produced by ADCs 14a based on output from sense circuits 13, and which represent currents induced in the stator windings by the rotor of motor M as it rotates. Another set of feedback signals are voltage sample streams Vabc corresponding to voltages sensed at each of the stator windings, which are digitized by ADCs 14b. In addition, ADC 14c in this architecture receives a signal from the voltage supply source, and produces voltage sample stream Vbus corresponding to the voltage level of the reference bus. As typical in the art, current sample streams Iabc from ADC 14a are applied to Clarke transform function 16a to produce spatially fixed $\alpha$ and $\beta$ phase feedback signals I$\alpha\beta$, transforming the three-phase time variant system of differential equations into a two coordinate time variant system. These transformed feedback signals I$\alpha\beta$ are input to Park transform function 17a, which in turn produces direct and quadrature phase feedback currents Id, Iq, respectively. Similarly, voltage sample streams Vabc from ADC 26b are input to Clarke transform function 16b to produce spatially fixed $\alpha$ and $\beta$ phase feedback signals V$\alpha\beta$ that are in turn input to Park transform function 17b, which produces direct and quadrature phase feedback voltages Vd and Vq. These direct and quadrature phase feedback currents Id, Iq, and corresponding direct and quadrature phase feedback voltages Vd, Vq, are applied to speed/position estimator function 18, which produces rotor position estimate $\hat{\theta}[n]$ and rotor velocity estimate $\hat{\omega}[n]$ corresponding to the measurements acquired by ADCs 14a through 14c in sample period n (i.e., at time instant $n \cdot T_s$, where $T_s$ is the sample period of ADCs 14); this current rotor velocity estimate $\hat{\omega}[n]$ is applied to speed controller function 10 as noted above.

As known in the art, the Park transform calculations require knowledge of rotor position, i.e. rotor angle, in order to align the d axis to rotor flux. As such, in this conventional architecture of FIG. 1a, an estimate $\hat{\theta}[n]$ of the current rotor position for sample period n is produced by speed/position estimator 18 and applied to Park transform function 17a in the feedback loop. Inverse Park transform function 5 also requires some estimate of rotor position but, because it is involved in the generation of the phase drive signals for a next time interval (i.e., at sample time $(n+1) \cdot T_s$), speed/position estimator 18 in this conventional architecture generates rotor position estimate $\hat{\theta}[n+1]$ for that next time interval n+1, and applies that estimate to inverse Park transform function 5. Conventionally, speed/position estimator 18 generates this forward-looking rotor position estimate $\hat{\theta}[n+1]$ multiplying the current rotor velocity estimate $\hat{\omega}[n]$ by the sample period ($T_s$), and adding that increment in rotor position to current rotor position estimate $\hat{\theta}[n]$ to predict the rotor position at sample time $(n+1) \cdot T_s$.

Figure 1B:
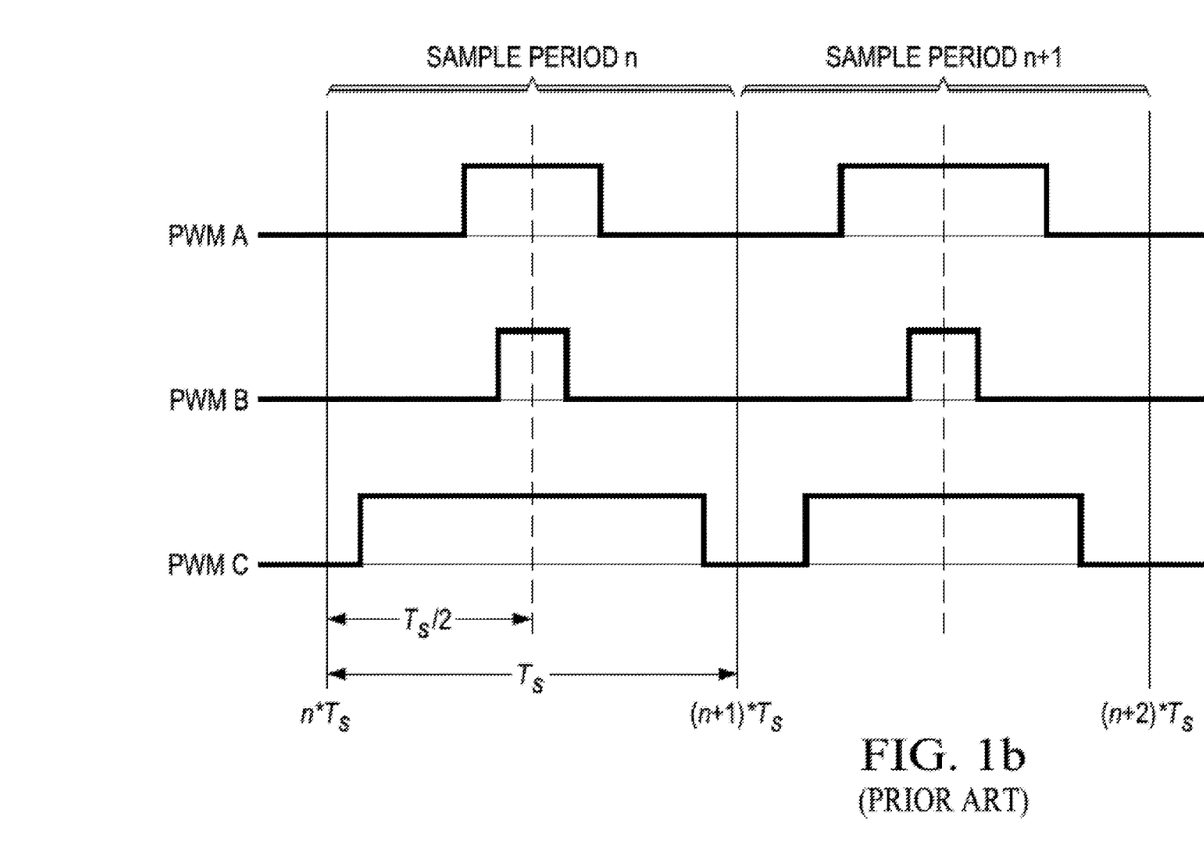
FIG. 1b is a timing diagram illustrating conventional alignment of pulse-width modulated (PWM) output control signals.

Modern motor control architectures, such as that shown in FIG. 1a, commonly deliver the drive commands in the form of pulse-width-modulated signals for each of the drive phases. FIG. 1b illustrates an example of the alignment of pulse-width modulated drive signals PWMa through PWMc for three phases of motor M. As shown in FIG. 1b, the midpoints of each of signals PWMa through PWMc are aligned at the midpoint time $T_s/2$ within each of sample periods n (i.e., between times $nT_s$ and $(n+1)T_s$) and n+1 (between times $(n+1)T_s$ and $(n+2)T_s$).

Conventional digital FOC architectures such as that shown in FIG. 1a operate in the discrete time domain, at a sampling frequency $f_s$ corresponding to period $T_s$ (i.e., the sample period of ADCs 14). In these conventional architectures, the frequency at which speed/position estimator 18 operates is also at that same frequency $f_s$, such that estimates of rotor position and velocity are generated for each time interval that input data are sampled in the feedback loop, and thus for each time interval for which pulse-width modulated signals are to be generated in the control loop. As such, in each period $T_s$ the feedback loop of the controller of FIG. 1a determines the control signals of the current rotor velocity estimate $\hat{\omega}[n]$, forward-looking rotor position estimate $\hat{\theta}[n+1]$, and feedback currents Id, Iq, and the control loop determines the PWM signals to be generated by PWM driver 8.

It has been observed, however, that the computational time required for speed/position estimator 18 to generate estimates of rotor position and velocity is often the limiting factor in the frequency at which the motor can be controlled. For example, the minimum time required to compute rotor position and velocity estimates, even for modern high-performance microcontrollers, is typically on the order of 50 μsec, which limits the control frequency to no faster than about 20 kHz. Accordingly, one may be forced to sacrifice accuracy in speed tracking performance or utilize more complex (e.g., multiple processor) architectures in order to attain the higher bandwidth motor control desired for modern fast response motors.

By way of further background, copending U.S. application Ser. No. 14/675,196, filed Mar. 31, 2015, commonly assigned herewith and incorporated herein by this reference, describes a motor controller architecture that includes a function for selecting a fractional delay compensation value to be applied in the estimate of rotor position for which pulse-width-modulated drive signals are to be applied to a multi-phase electric motor, to compensate for the half-period delay necessitated by alignment of the multi-phase PWM signals with one another within the sample period as shown in FIG. 1b, and for other implementation-dependent delays from external controller components and other factors.

BRIEF SUMMARY OF THE INVENTION

One or more of the disclosed embodiments provide a controller architecture and corresponding control method capable of high bandwidth control of electric machines, such as an AC electric motor, in a manner is not limited by the computational capacity of the state estimation function.

One or more of the disclosed embodiments provide such an architecture and method that can be implemented into existing control loops in a computationally efficient manner, and without requiring additional external circuitry or components.

One or more of the disclosed embodiments provide such an architecture and method in which the computational capacity of the controller can be freed up for functions other than state estimation.

Other objects and advantages of the disclosed embodiments will be apparent to those of ordinary skill in the art having reference to the following specification together with its drawings.

According to certain embodiments, the control architecture for an electric motor, and a corresponding control method, includes a state estimation function that operates asynchronously with the control loop for the motor. Feedback data samples from the motor are time-stamped as received by the state estimation function. State estimation, such as estimation of rotor position and rotor velocity for an electric motor, is performed by the controller as a background task relative to the generation of control signals for application to the motor in a next control period. State estimates, when calculated, are stored with the same time-stamp to indicate the sample period of the corresponding input data. Control signals are based on the most recently calculated state estimates, updated to the operative control period based on the timestamp of those most recent state estimates.

DETAILED DESCRIPTION OF THE INVENTION

The one or more embodiments described in this specification are implemented into a control system for a permanent magnet synchronous motor (PMSM), more specifically in the context of field-oriented control (FOC) for such a motor, as it is contemplated that implementation of these embodiments is particularly advantageous in that context. However, it is also contemplated that concepts of this invention may be beneficially applied in other applications, for example AC induction motors and other types of AC motors and machines. Accordingly, it is to be understood that the following description is provided by way of example only, and is not intended to limit the true scope of this invention as claimed.

Figure 2:
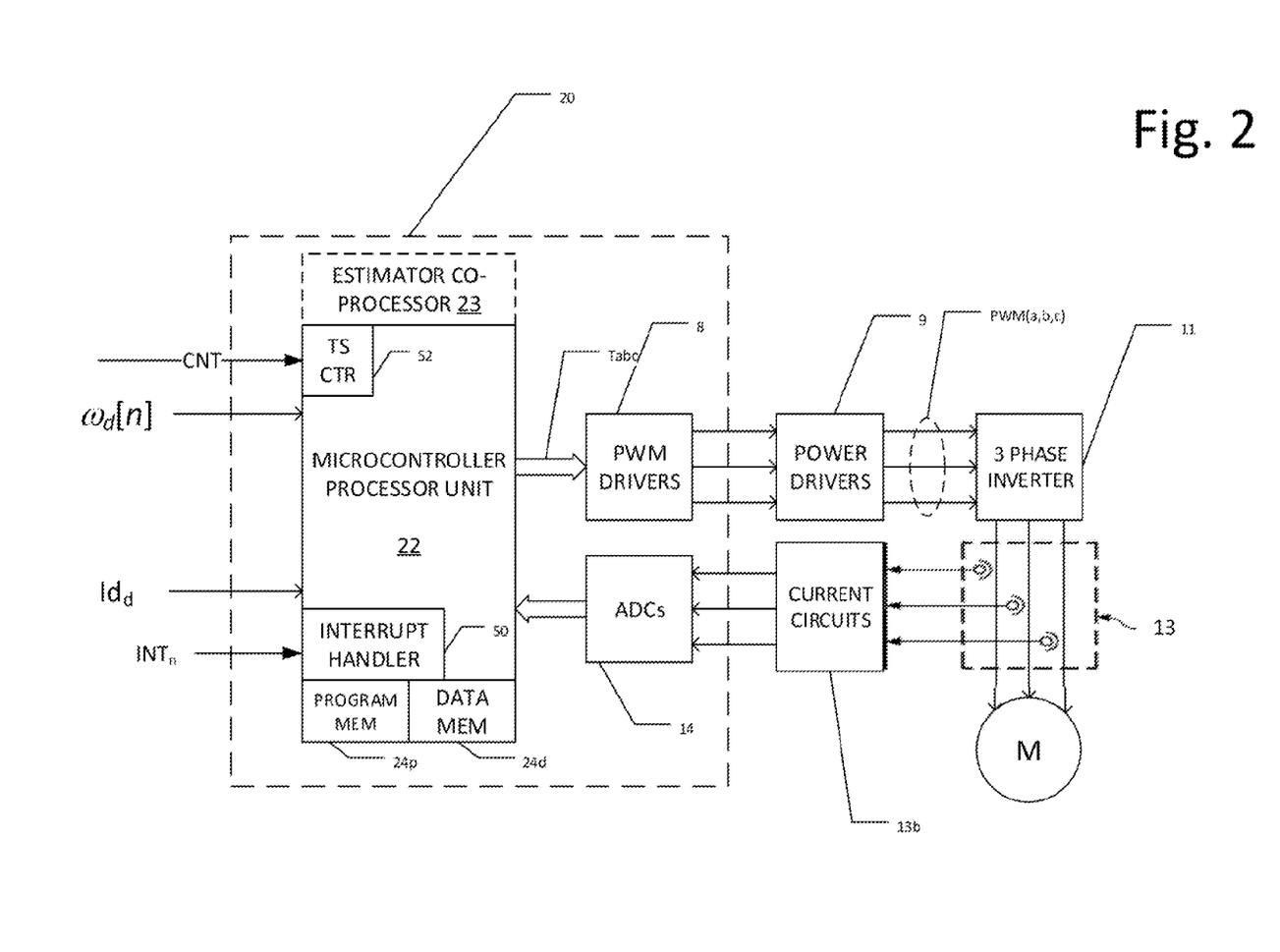
FIG. 2 is a block diagram of a motor controller architecture according to an embodiment.

FIG. 2 illustrates, in the form of a block diagram, an example of a field-oriented control (FOC) control system for an electric machine, according to an embodiment. In the example of FIG. 2, the electric machine under control of this system is permanent magnet synchronous motor M, which has three stator windings arranged 120° out of phase relative to one another in the conventional manner. As will be apparent to those skilled in the art having reference to this specification, the number of phases in motor M may vary from the three phases shown in FIG. 2. In this embodiment, much of the control architecture is implemented by programmable microcontroller integrated circuit (MCU) 20, enabling many of the calculations and control loop functions to be carried out in the digital domain. Examples of integrated circuits suitable for use as MCU 20 according to these embodiments include microcontrollers in the C2000 and MSP430 families available from Texas Instruments Incorporated. In the example of FIG. 2, MCU 20 includes microcontroller processor unit 22, which receives a desired direct phase reference current signal $Id_d$ and a desired motor speed signal $\omega_d[n]$ from external to MCU 20, along with feedback signals from motor M as will be described below. Processor unit 22 is coupled to program memory 24p, which stores program instructions for retrieval and execution by processor unit 22 upon the received reference and feedback signals; according to this embodiment, the program instructions stored in program memory 24p cause processor unit 22 to perform the various control functions described in this specification. Processor unit 22 is also coupled to data memory 24d, which stores data applied and calculated by processor unit 22 in its motor control operation. The result of this program execution by processor unit 22 are three-phase data signals Tabc indicative of the pulse-width-modulation duty cycles at which the three phases (i.e., phases a, b, c, respectively) of motor M are to be driven. Data signals Tabc are applied to PWM drivers 8 in MCU 20, which in turn generate output control signals that are applied to power driver circuits 9, which in turn generates the corresponding pulse-width-modulated pulses on lines PWM(a, b, c), at the appropriate frequency and phase that are applied to three-phase inverter 11 for driving motor M at the desired speed.

As will be described below, state estimation and control functions are executed asynchronously relative to one another in these embodiments, which facilitates the use of a co-processor architecture to execute the state estimation routines. This co-processor architecture for MCU 20 is illustrated in FIG. 2 by optional estimator co-processor 23, which is in close communication with processor unit 22 within MCU 20, and which executes the estimation of rotor position and velocity from the digitized feedback signals acquired by ADCs 14. Examples of suitable co-processors that are suitable for use as estimator co-processor 23 include the TMS320x2803/6x PICCOLO and TMS320F2837xD dual-core DELFINO control law accelerators (CLAs) available from Texas Instruments Incorporated. It is contemplated that those skilled in the art having reference to this specification will be readily able to implement the state estimation function in such a co-processor architecture, without undue experimentation. Alternatively, processor unit 22 may itself execute the state estimation functions described below, according to these embodiments.

The feedback side of the control system of FIG. 2 includes current sensors 13 that in this example sense electrical conditions at each of the stators of motor M. As will be evident in the following description for this embodiment, these electrical conditions correspond to currents in the stator windings and to voltages indicative of the inductance of stator windings as a function of rotor position or rotor angle (the terms "rotor position" and "rotor angle" are used synonymously in this description). These sensed electrical parameters are, in this example, communicated to analog-to-digital-converters (ADCs) 14 in MCU 20 via conventional analog current circuits 13b. ADCs 14 in MCU 20 sample these signals at the frequency of sample clock $T_s$, to generate digital data values representative of the sensed electrical parameters at motor M. Those digital sampled values are then applied to processor unit 22 for processing according to the control algorithm expressed in program instructions stored in program memory 24p, which described in further detail below, to produce the appropriate drive signals to control motor M.

According to this embodiment, MCU 20 operates in the form of a multi-tasking control system, within which control algorithms are executed within an interrupt service routine (ISR). This ISR runs periodically, for example at a frequency corresponding to the sampling frequency (i.e., the frequency at which input samples are obtained by ADCs 14 in the feedback loop) or the control loop frequency (i.e., the frequency at which multiphase control signals Tabc are generated), or both, in the case in which motor control is applied at the same frequency at which input data samples are acquired, as is often the case in conventional FOC motor control systems. In this multi-tasking environment, MCU 20 may carry out various commands in addition to the periodic motor control function, such commands being issued from a higher-level application for the equipment in which motor M is implemented. For example, motor M may be a motor in an appliance, robot, or other larger scale industrial or environmental (i.e., HVAC) system that executes a higher level operational application in carrying out its function. As such, the motor control architecture of FIG. 2 may be realized in a larger scale computing or functional system, with other processors etc. providing commands to MCU 20 within the context of that higher-level application. In addition to the execution of those commands, processor unit 22 (and, if implemented, estimator co-processor 23) is also called upon to execute the state estimation function, as will be described below in further detail. In the ISR context of this embodiment, interrupt handler 50 is provided within or in conjunction with speed/position estimator function 48 (and the other control functions of the architecture of FIG. 3) in MCU 20, to receive interrupts $INT_n$ pertaining to the motor control, external command, and state estimation functions, and to schedule the execution of those functions within the sampling period according to a priority scheme. Timestamp counter (TS CTR) 52 is also implemented within MCU 20 in this embodiment, for use in connection with the state estimation function as will be described below, and may be realized by a conventional 16-bit or 32-bit digital counter, clocked by a real-time clock signal CNT to advance its contents either up or down, as the case may be, upon each cycle of clock signal CNT.

In the example of FIG. 2, PWM drivers 8 and ADCs 14 are implemented within MCU 20, i.e. in the same integrated circuit as processor unit 22. This integration of PWM drivers 8 and ADCs 14 thus follows the architecture of the C2000 MCUs noted above. Alternatively, PWM drivers 8 and ADCs 14 may be implemented "off-chip" relative to processor unit 22, as known in the art. Additionally, the example of FIG. 2 illustrates program memory 24p as also integrated into the same integrated circuit as processor unit 22; alternatively, program memory 24p may of course be implemented in a separate integrated circuit if desired. In any case, it is contemplated that other functions and interfaces of MCU 20, beyond those shown in FIG. 2, will be realized in the conventional manner, for example as appropriate for the C2000 and MSP430 MCU architectures noted above.

Further in the alternative, the functions of MCU 20 may be realized in other architectures, and are not necessarily implemented by a programmable logic device. For example, these functions may be realized in whole or in part as custom logic devices. It is contemplated that those skilled in the art having reference to this specification will be readily able to implement the controller functions described herein according to the circuitry desired for particular implementations.

Figure 3:
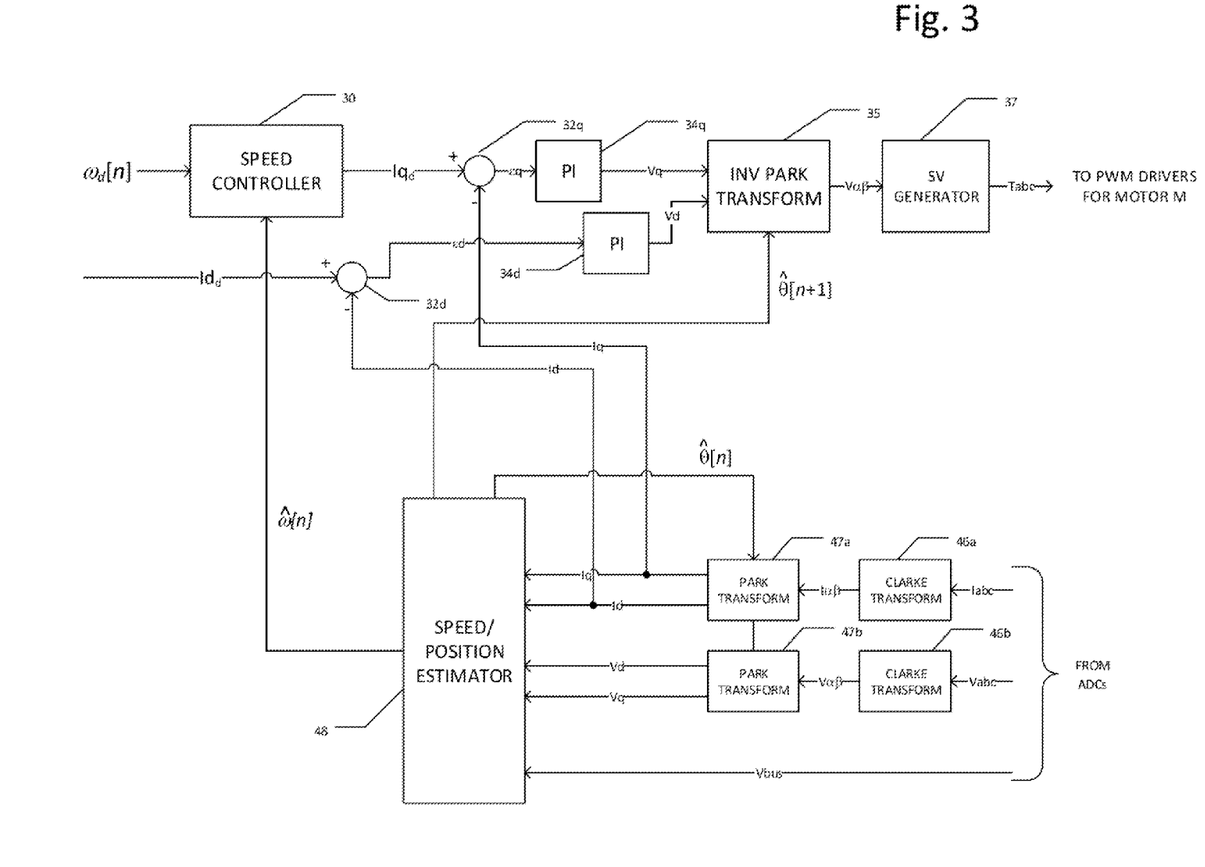
FIG. 3 is a functional block diagram of a digital portion of a microcontroller architecture for motor control according to the embodiment of FIG. 2.

FIG. 3 illustrates the functional architecture of a field-oriented control (FOC) motor control system, for example as may be implemented within MCU 20 in the hardware architecture of FIG. 2, according to an embodiment. An external control signal $\omega_d[n]$ indicating the desired motor speed is received by speed controller 30, which also receives an estimate $\hat{\omega}[n]$ of the current rotor velocity of motor M, as determined by the feedback loop portion of this architecture. Speed controller 30 generates the desired quadrature phase current $Iq_d$ based on these two inputs, for example by applying a conventional control function. Desired quadrature phase current $Iq_d$ corresponds to the desired torque component (i.e., the q component in the d, q domain), and is applied to error generator 32q along with quadrature phase feedback current Iq. Error generator 32q generates quadrature phase error signal ∈q corresponding to the difference of quadrature phase reference and feedback currents $Iq_d$, Iq, respectively, and which is applied to proportional-integral (PI) controller 34q. PI controller 34q applies a conventional control function (e.g., proportional-integral) to that quadrature phase error signal ∈q to produce quadrature phase control signal Vq, which is applied to inverse Park transform function 36. For the direct phase d component, error generator 32d similarly receives the desired direct phase current $Id_d$ along with feedback current Id, and forwards error signal ∈d corresponding to the difference of those two currents to proportional-integral (PI) controller 34d. Controller 34d in turn applies a conventional control function, for example a combination of proportional and integral functions, to this error signal ∈d to produce direct phase control signal Vd for application to inverse Park transform function 36.

As described above relative to FIG. 1a, inverse Park transform function 35 transforms the d and q phase control signals Vd, Vq to spatially fixed α and β phase control signals Vαβ. That inverse Park transform requires knowledge of the rotor position (more specifically, the rotor flux or field flux linkage angle), which in this embodiment is supplied by speed/position estimator function 48 as rotor position estimate $\hat{\theta}[n+1]$ for the next control cycle [n+1]. The generation of this rotor position estimate according to these embodiment will be described in further detail below. As shown in FIG. 3, phase control signals Vαβ from inverse Park transform function 36 are applied to space vector generator 38, which produces three-phase data signals Tabc supplied to PWM drivers 8 (FIG. 2).

If desired, a fractional delay compensator function may be optionally be included in the functional architecture of FIG. 3, to generate a delay-compensated rotor position estimate $\hat{\theta}[n+1+k]$ based on the values of rotor position estimate $\hat{\theta}[n+1]$ and rotor velocity estimate $\hat{\omega}[n]$ produced by speed/position estimator function 48, as described in the above-incorporated U.S. application Ser. No. 14/675,196. This delay-compensated rotor position estimate $\hat{\theta}[n+1+k]$ is an estimate of the rotor position for a point in time in the next sample period n+1 at which the output control signals Tabc are to be applied to motor M, specifically the point in time (fractional delay time $k \cdot T_s$) within that next sample period indicated by a fractional delay k that includes all delays in the control architecture that can affect the application of the drive signals to motor M. Alternatively, compensation for the half-period delay resulting from alignment of the multi-phase PWM signals with one another within the sample period may be implemented, for example as described in Bae et al., "A Compensation Method for Time Delay of Full-Digital Synchronous Frame Current Regulator of PWM AC Drives", incorporated herein by reference.

On the feedback side of the control loop in this architecture, Clarke transform function 46a receives sampled currents Iabc associated with the three motor phases and acquired for the current sample period n, as produced by ADCs 14 based on the electrical parameters sensed by sensors 11 (FIG. 2). This sample period n corresponds to the period at which control signals are generated and applied to motor M; the sample rate of ADCs 14 may differ (i.e., be a higher rate) than this control loop sample frequency. From these inputs, Clarke transform function 46a produces spatially fixed α and β phase feedback signals Iαβ, which in turn are applied to Park transform function 47a to produce d and q phase feedback signals Id, Iq, respectively. These feedback signals Id, Iq are applied to error generators 32d, 32q, respectively, as discussed above. Similarly, Clarke transform function 46b receives sampled voltages Vabc from ADCs 14, and produce α and β phase voltage feedback signals Vαβ, which are applied to Park transform function 47b to produce d and q phase voltage feedback signals Vd, Vq, respectively. Current feedback signals Id, Iq and voltage feedback signals Vd, Vq as well as sensed bus voltage Vbus from ADCs 14, are forwarded to speed/position estimator function 48, which will generate state (e.g., rotor position and velocity) estimates for use in the control loop as will be described below in connection with these embodiments.

As described above, the architecture of the FOC motor control system in the embodiment shown in FIG. 3 is a relatively high-performance architecture, as it generates its feedback signals Id, Iq, Vd, Vq from a relatively large set of sensor signals, namely three currents Iabc from three motor phases, three voltages Vabc from three voltage phases, and bus voltage Vbus. It is contemplated, however, that these embodiments may be implemented in other FOC motor control architectures, including those in which fewer sensor signals are sampled and applied to the feedback loop. For example, these embodiments may be implemented in a system based on two sampled currents (from two of the motor phases) and the bus voltage Vbus. In such architectures in which fewer sampled signals are obtained, it is contemplated that the necessary values for the other terms (e.g., voltages and currents for the other phases) may be estimated from the signal values that are sampled, as known in the art. Examples of such estimation include those in which one or two of three phase currents are measured, the other phase currents are estimated, the bus voltage Vbus is measured, and some or all of the three voltages Vabc are estimated; and those in which a bus current Ibus is measured, the phase currents are estimated, the bus voltage Vbus is measured, and some or all of the three voltages Vabc are estimated; among others. In any case, the control algorithm according to these embodiments does not require determination of the metric signal in a particular manner, so long as the appropriate feedback signals and metric signal can be determined.

It is contemplated that the functional architecture illustrated in FIG. 3 may be implemented in software routines stored in program memory 24p and that are executed by processor unit 22 and, if implemented, estimator co-processor 23, in MCU 20 of FIG. 2. Functions such as PWM drivers 8, ADCs 14 within MCU 20 are implemented as hardware functions, as are the analog functions of power drivers 9, inverter 11, and current circuits 13 as shown in FIG. 2. Alternatively, of course, it is contemplated that the selection of hardware versus software to implement particular functions according to these embodiments can vary from this arrangement, which is shown by way of example only.

As mentioned above, the task of speed/position estimator function 48 in the functional architecture of FIG. 3 is to produce a rotor position estimate $\hat{\theta}[n]$ for the current sample period (i.e., the control loop period corresponding to the sampled sensed feedback currents and voltages provided by ADCs 14), a rotor velocity estimate $\hat{\dot{\theta}}[n]$ for that same current sample period, and a forward-looking rotor position estimate $\hat{\theta}[n+1]$ for the next sample period, i.e. the sample period n+1 for which the output control signals Tabc are to be generated. According to these embodiments, however, speed/position estimator function 48 executes the estimation routines in a background manner relative to the generation of control signals by speed controller 30, PI controllers 34d, 34q, inverse Park transform 35, and space vector generator 36 in the control loop, which are to be generated for each sample period n in order to smoothly and properly control motor M as indicated by the received input signals $\omega_d$, $Id_d$.

Figure 4:
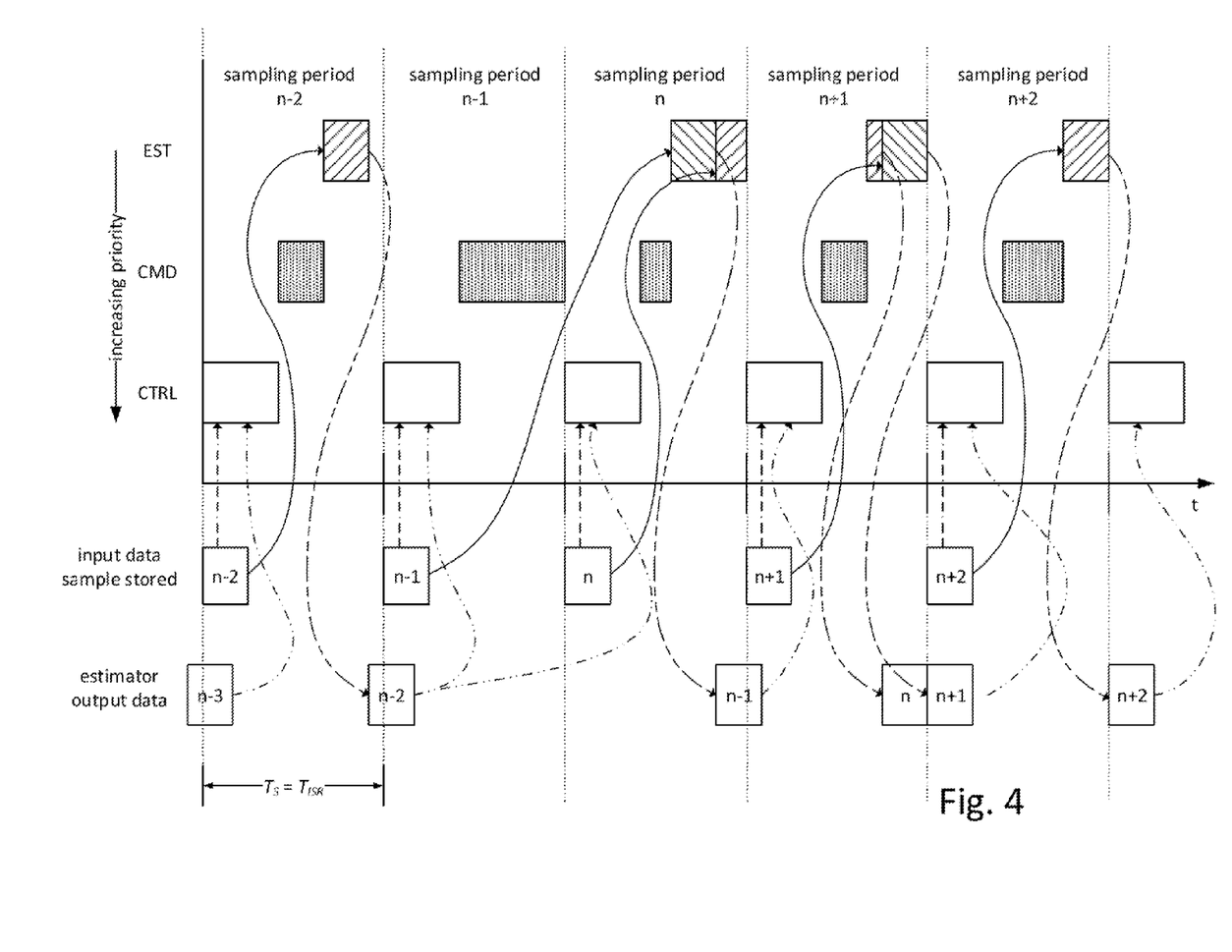
FIG. 4 is a timing diagram illustrating an example of the operation of the architecture of FIGS. 2 and 3 according to an embodiment.

As described above in connection with FIG. 2, MCU 20 operates as a multi-tasking control system, in which corresponding control algorithms are executed within an interrupt service routine (ISR) that runs periodically, for example at a frequency corresponding to the control loop frequency such that input data acquired in each control period are used to determine those multiphase control signals for application to motor M for the next period. FIG. 4 illustrates an example of the operation of MCU 20 in this periodic interrupt service routine context. In this example, ISR period $T_{ISR}$ is the same as sampling period $T_s$ at which data are acquired by and from ADCs 14, and at which the control loop (i.e., controllers 30, 34q, 34d, inverse Park transform 35, and space vector generator function 37) responds and produces the multiphase motor control signals from each sample of sensed signals. In the time sequence of FIG. 4, input data samples are acquired by and from ADCs 14 at the beginning of each sampling period. For smooth motor operation, generation of the motor control signals is preferably performed each sampling period, and as such interrupt handler 50 schedules execution of the control task CTRL at the highest priority in each period during which motor control is enabled, with at least some command tasks CMD in response to command interrupts from the higher-level application or other sources having the next higher priority, as shown in FIG. 4. According to this embodiment, state estimation is executed by speed/position estimation function 48 asynchronously relative to the control function. This asynchronous execution is realized, in this example, by state estimation task EST having a lower priority than both control tasks CTRL and at least some command tasks CMD; it is contemplated that certain command tasks may have lower priority than state estimation task EST.

Application of this interrupt priority, for the case in which interrupts for each of the control, command, and state estimation tasks are active in each sampling period, results in MCU 20 executing an instance of control task CTRL at the beginning of each sampling period. In sampling period n−2 shown in FIG. 4, control task CTRL is executed first, followed by the execution of a command task CMD. Upon completion of the execution of command task CMD in sampling period n−2, speed/position estimation function 48 then executes state estimation task EST to compute state estimates from the input sample data received in this sampling period n−2, completing this estimation task EST before the end of sample period n−2. In the next sampling period n−1, control task CTRL is again executed first, followed by the execution of a command task CMD. In this sampling period n−1, however, execution of the command task consumes the remainder of sampling period n−1, leaving no time for the execution of state estimation task EST. As a result, state estimates based on the input sample data acquired in this sampling period n−1 are not available at the end of the period, and are thus not available for the control task CTRL in the next sampling period n.

According to this embodiment, the calculation of state estimates based on the input sample data acquired in sampling period n−1 are delayed until a later sampling period in which execution time is available for state estimation task EST. In the example of FIG. 4, command task CMD is completed relatively early in sampling period n, following which state estimation task EST is executed for the input sample data acquired in sampling period n−1. In the time remaining in sampling period n, an instance of state estimation task EST is initiated for the input sample data acquired in sampling period n, but is only partially executed by the end of sampling period n. The remainder of this instance of state estimation task EST is executed in a later sampling period (period n+1, in this example). Execution of these tasks continue for subsequent sampling periods in this manner.

The result of this operation is that the calculation of estimates of the state of motor M are independent from and asynchronous with the generation of control signals for motor M. As a result, the sample rate at which motor M is controlled does not depend on, and thus is not limited by, the rate at which state estimates are calculated. This configuration allows for MCU 20 to control a wider range of motors, including those with very fast response to control signals, as well as smoother control of motors of various response times, without necessitating a corresponding increase in computational capacity of the controller.

Smooth and accurate control of the motor does depend on accurate and up-to-date knowledge of rotor position and velocity, however. These embodiments provide updated estimates of those parameters as applied to the control loop, despite the possible unavailability of state estimates based on the most recently acquired input data sample, as in the case of sampling period n in the example of FIG. 4.

Figure 5:
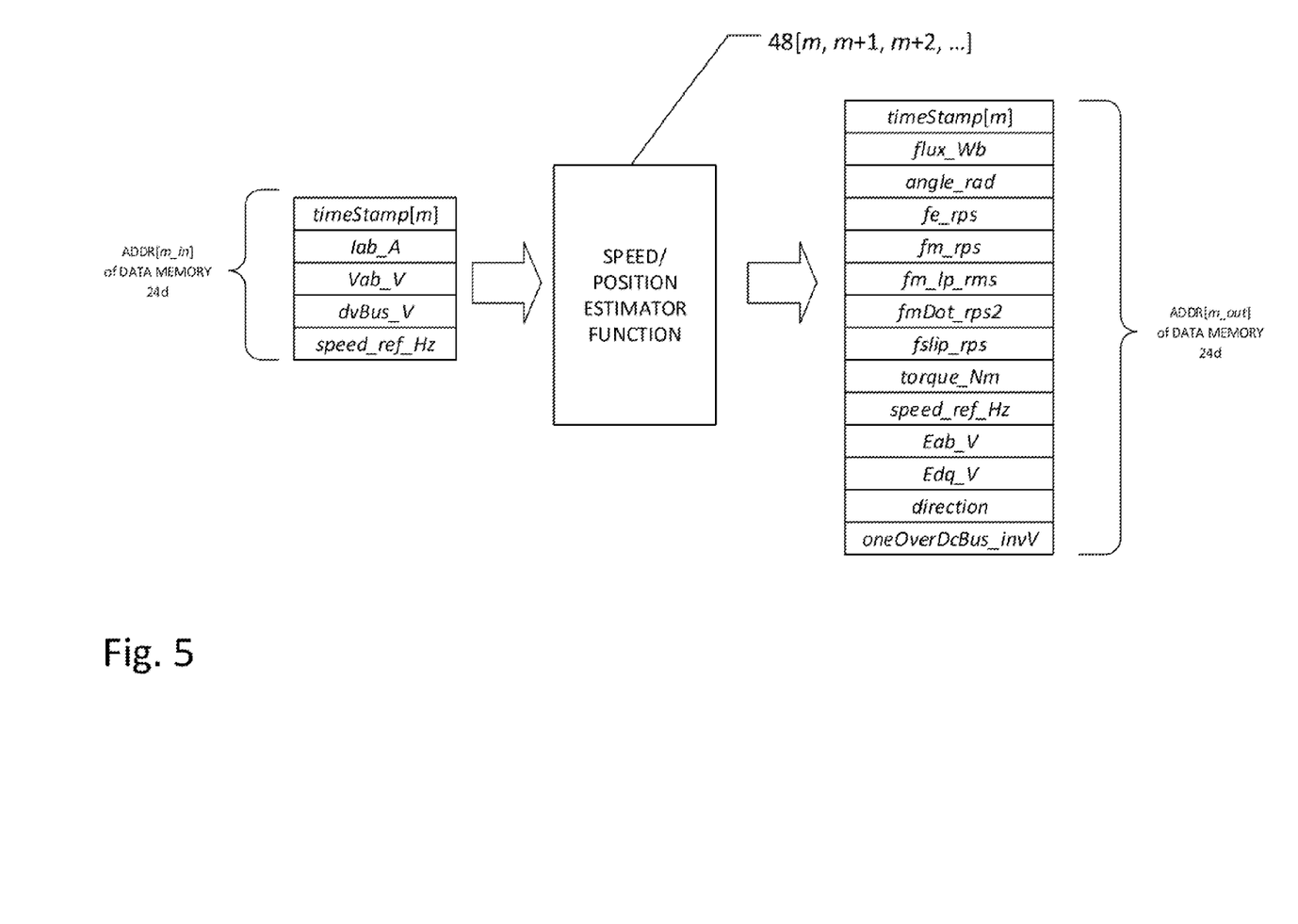
FIG. 5 is a diagram of an example of the input data sample with timestamp, and estimator output data with timestamp, as stored in data memory according to the embodiment of FIG. 4.

According to these embodiments, speed/position estimator function 48 stores a timestamp associated with each input data sample it receives from ADCs 14 (via Clarke and Park transforms 46, 47, respectively, for sensed currents and voltages as described above). In this embodiment, the timestamp values stored with these input data samples denotes the sampling period for which those sample values are acquired, for example expressed as the contents of timestamp counter 52 of MCU 20. These input data and the associated timestamp value are stored in memory accessible to speed/position estimator function 48, such as in data memory 24d of MCU 20 in FIG. 2. FIG. 5 illustrates an example of the input data sample values stored in data memory 24d. In this example, the input data sample for sampling period (or sampling period) m stored at address ADDR[m_in] include:

| Data value | Input data | Units |
|---|---|---|
| timeStamp | sampling period in which input data sample was acquired | counter value |
| Iab_A | sampled current values at the output of Clarke transform function 46a | Amperes, in $\alpha$, $\beta$ coordinates |
| Vab_V | sampled voltage values at the output of Clarke transform function 46b | Volts, in $\alpha$, $\beta$ coordinates |
| dvBus_V | sampled bus voltage value from ADC 14c (FIG. 1a) | Volts |
| speed_ref_Hz | input rotor speed sample value corresponding to velocity input signal $\omega_d$ for sampling period m | Hz |

Upon the execution of an instance EST by speed/position estimator function 48, which may occur in sampling period m in which these data are acquired, or in a later sampling period m+1, m+2, etc. as described above, speed/position estimator function 48 calculates one or more estimates of the state of motor M from the corresponding input data sample from period m, and stores those state estimates as estimator output data in memory, along with the same timestamp value as associated with the corresponding input data sample for period m. In the example of FIG. 5, these estimator output data are stored at address ADDR[m_out] of data memory 24d and include the timestamp value timestamp[m] indicating the ISR/sample period in which the corresponding input data sample was acquired. Examples of the estimator output data stored at this address ADDR[m_out] include:

| Data value | Motor state | Units |
|---|---|---|
| timeStamp | sampling period in which input data sample was acquired | counter value |
| flux_Wb | magnetic flux level in the motor | Webers |
| angle_rad | electrical angular position of the rotor | radians |
| fe_rps | electrical angular velocity of the rotor | radians/second |
| fm_rps | mechanical angular velocity of the rotor | radians/second |
| fm_lp_rps | low-pass filtered value for the mechanical angular velocity of the rotor | radians/second |
| fm_rps | mechanical angular acceleration of the rotor | radians/second$^2$ |
| fslip_rps | slip frequency of the rotor | radians/second |
| torque_Nm | electrical torque of the motor | Newton-meters |
| Eab_V | back emf of the motor | Volts, in $\alpha$, $\beta$ coordinates |
| Edq_V | back emf of the motor | Volts, in d, q coordinates |
| direction | direction of rotation of the rotor | +/− |
| oneOverDcBus_invV | inverse of the DC bus voltage | Volts$^{-1}$ |

It is contemplated that conventional algorithms and techniques may be used to calculate these state estimates from the corresponding input data sample values. Examples of speed and position estimator algorithms and methods suitable in speed/position estimator function 48 in this embodiment are described in copending U.S. application Ser. Nos. 14/337,576 and 14/337,595, both filed Jul. 22, 2014 commonly assigned herewith, and incorporated herein by reference.

Referring back to FIG. 4, the asynchronous operation of speed/velocity estimator function 48 according to this embodiment is apparent from the relative timing of the storing of the input data sample for a given sampling period, and the storing of the estimator output data generated by an instance of estimation task EST upon that same input data sample. In sampling period n−2, the input data sample for sampling period n−2 is acquired and stored in data memory 24d, as described above. Meanwhile, the control task CTRL executed in sampling period n−2 generates multiphase control signals based on that input data sample acquired in sampling period n−2 and also the estimator output data for previous sampling period n−3. The execution of the instance of estimation task EST in sampling period n−2, upon the input data sample acquired in sampling period n−2, provides the control task CTRL in sampling period n−1 with estimator output data for sampling period n−2, which is combined with certain input data acquired in sampling period n−1 itself (e.g., currents Iq, Id applied to controllers 32q, 32d, respectively), to produce the multiphase control signals to be applied to drive motor M in the next period n.

However, as described above in connection with this example, the duration of the higher-priority command task CMD allowed no computation time for the execution of an instance of estimation task EST in sampling period n−1. Accordingly, no estimator output data based on the input data sample acquired in sampling period n−1 are available by the time that the control task CTRL executes in sampling period n. According to this embodiment, the instance of the control task CTRL executed in sampling period n uses the most recent estimator output data, which is that calculated from the input data sample acquired in sample period n−2, to produce the multiphase control signals to drive motor M in the next period n+1. While the use of state estimates such as rotor position and velocity from two or more periods prior to a current period for which motor control signals are being generated will insert misalignment error into the operation of the motor, embodiments of this invention are capable of compensating for this asynchronous state estimation, as will now be described in connection with FIG. 6.

Figure 6:
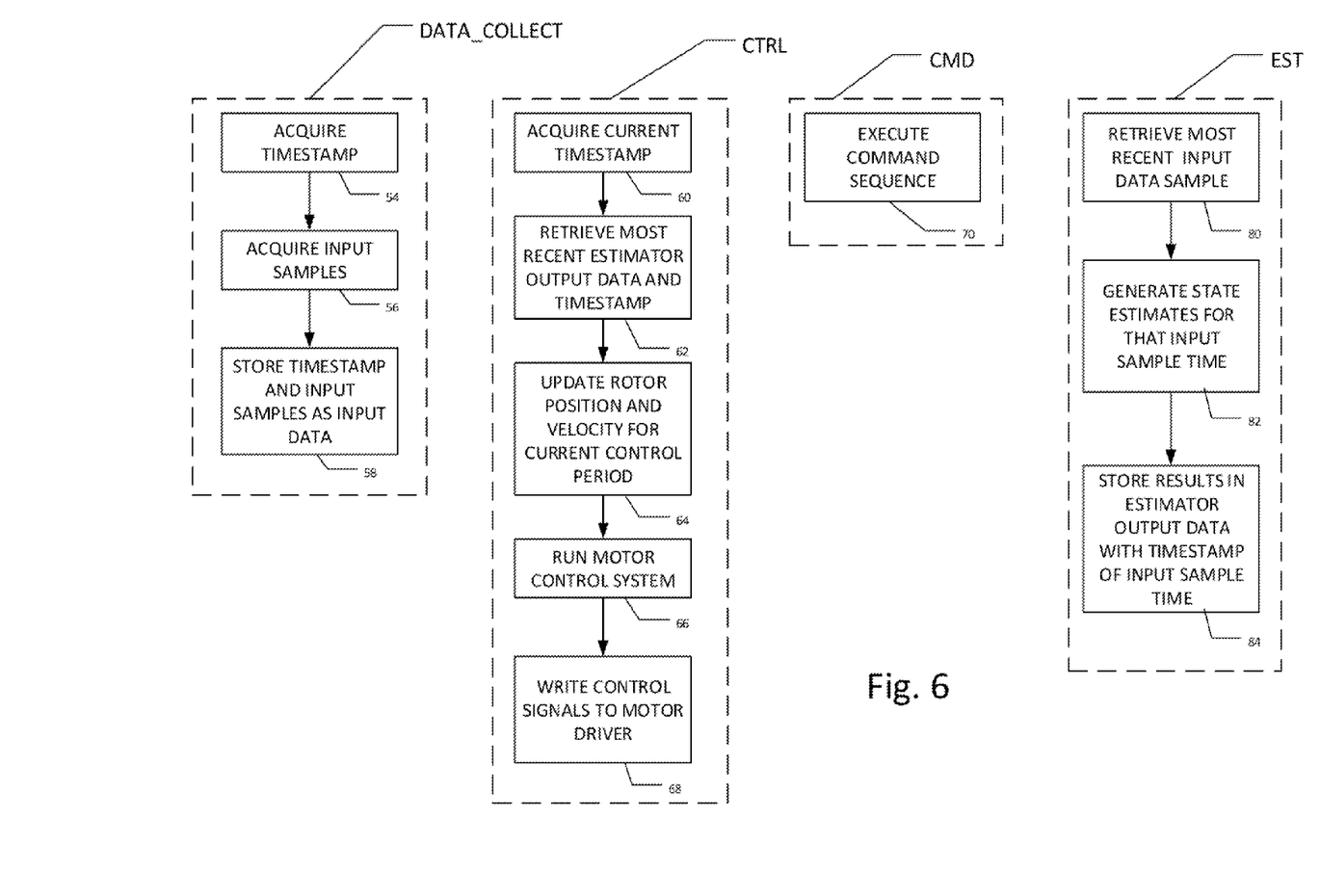
FIG. 6 is a flow diagram of the operation of control, command, and execution tasks within an interrupt service routine period, according to the embodiment of FIGS. 4 and 5.

FIG. 6 illustrates the operations executed by MCU 20 in carrying out the control task CTRL, command task CMD, and estimation task EST in each sampling period, such as shown in FIG. 4, along with a data collection task DATA_COLLECT. At the beginning of each sampling period, data collection task DATA_COLLECT is performed to acquire a new input data sample associated with that sampling period and to store that input data sample in memory, as shown in FIG. 4 for each of the sampling periods n−2 through n+2. For purposes of this description, this data collection task DATA_COLLECT may be considered as unconditional (i.e., not necessarily in response to an interrupt); alternatively, an associated interrupt for this task may be received by interrupt handler 50, and scheduled for execution in each sampling period, for example at the highest priority among the other tasks shown in FIG. 6. In any case, data collection task DATA_COLLECT begins with process 54 in which a timestamp value is obtained from timestamp counter 52 of MCU 20. In process 56, samples of sensor data from sensors at motor M are acquired, either directly from ADCs 14 or via the various transform functions 46, 47 as shown in FIG. 3.

In process 58, input data corresponding to that sensor data are stored in data memory 24d, such input data including values such as those described above relative to FIG. 5, along with the associated timestamp value from counter 52 acquired in process 54, indicating the time at which these data were acquired.

In the interrupt service routine arrangement of this embodiment, as described above, one or more interrupts may be received and are active in this current sampling period. As mentioned above, interrupt handler 50 schedules the execution of software routines to handle these interrupts according to a priority scheme, in the conventional manner. In this embodiment, control task interrupts are of the highest priority and estimation task interrupts are of a lower priority; at least some command task interrupts are of a priority below that of control task interrupts but higher than state estimation task interrupts. As such, if a control task interrupt has been received, that interrupt being of the highest priority, interrupt handler 50 will schedule an instance of control task CTRL for execution. Execution of control task CTRL as will be described in further detail below. If a command task interrupt is active, interrupt handler 50 schedules execution of command task CMD accordingly (e.g., following the execution of control task CTRL as shown in FIG. 4). Execution of command task CMD involves execution of the corresponding command sequence in process 70 shown in FIG. 6, according to a software routine corresponding to the particular command received.

If an estimation task interrupt is active in this sampling period, interrupt handler 50 also schedules an instance of estimation task EST for execution, according to the priority scheme discussed above, and subject to time being available in the current sampling period as described above relative to FIG. 4. FIG. 6 illustrates the execution of an instance of estimation task EST according to this embodiment. In this example, estimation task EST is executed beginning with retrieval of the most recent input data sample from data memory 24d in process 80. In process 82, speed/position estimator function 48 generates state estimates from the particular input data sample values retrieved in process 80, for example by using conventional state estimation algorithms and routines, and those described in the above-incorporated copending U.S. application Ser. Nos. 14/337,576 and 14/337,595. In process 84, these state estimates are stored in memory (e.g., data memory 24d), along with the timestamp value indicating the time (i.e., sample period) at which the input data sample was acquired. In this embodiment, the state estimates generated in process 82 and stored in process 84 include estimates of rotor position and velocity, as well as other state estimate values such as those described above relative to FIG. 5.

As described above, the control task CTRL is the highest priority interrupt in each operational cycle. In this embodiment, speed/position estimator function 48 of MCU 20 executes an instance of control task CTRL, beginning with process 60 in which a current timestamp value is acquired from timestamp counter 52. This current timestamp value indicates a time of the current sampling period for which the control signals are being generated in this instance of control task CTRL. In process 62, the most recent estimator output data are retrieved from data memory 24d, along with the timestamp value stored for that estimator output data in process 84 of the relevant instance of estimation task EST. These estimator output data may be the state estimates from the immediately preceding sampling period, as in the case of sampling period n−1 in FIG. 4, or may be the state estimates from one or more sampling periods prior to the immediately preceding period, as in the case of sampling period n in which the estimator output data from sampling period n−2 are the most recent state estimates. As mentioned above, estimates such as rotor position and velocity from two or more periods prior to the execution of the control task CTRL would result in misalignment error in the output control signals. According to this embodiment, execution of the control task CTRL is performed by MCU 20 to compensate for latency of the state estimates, as well as the variability of that latency from period to period. Specifically, process 64 of control task CTRL in FIG. 6 updates the rotor position and velocity for the current sample period, using the timestamp values stored in data memory 24d for those estimate values.

An estimate $\hat{\omega}[p]$ of the angular velocity of the rotor of motor M, at a time sample instant p, may be expressed as:

$$\hat{\omega}[p]=\hat{\omega}[m]+\hat{\alpha}[m]\cdot(p-m)\cdot T_{ISR}$$

where $\hat{\omega}[m]$ is the estimate of the angular velocity at time sample m, $\hat{\alpha}[m]$ is the estimate of the angular acceleration at time sample m, and $T_{ISR}$ is the duration of the sampling period. In this expression, m is the sampling period for which the most recent state estimates are retrieved in process 62, based on the timestamp associated with those estimates, while p is a timestamp value for the current sampling period in which control task CTRL is being executed. In these retrieved state estimates from sampling period m, the value fm_rps in the stored state estimates of FIG. 5 corresponds to the angular velocity estimate $\hat{\omega}[m]$ in this expression, and the value fmDot_rps2 in the stored state estimates corresponds to the angular acceleration estimate $\hat{\alpha}[m]$ in this expression. The timestamp value timestamp for these state estimates, which indicates the sampling period m of the input data sample upon which those estimates were calculated, is also retrieved. According to this expression, therefore, the updated angular velocity estimate $\hat{\omega}[p]$ is calculated in process 64 by multiplying the angular acceleration estimate $\hat{\alpha}[m]$ by the elapsed time $(p-m)\cdot T_{ISR}$ between ISR sample m and ISR sample p, and adding that product to the angular velocity estimate $\hat{\omega}[m]$. The storing and retrieval of the timestamp value according to this embodiment enables the determination of the elapsed time between sampling period m and sampling period p. Once the updated angular velocity estimate $\hat{\omega}[p]$ is calculated, process 64 also calculates an updated angular position $\hat{\theta}[p]$ estimate for sampling period p from that updated estimate for angular velocity $\hat{\omega}[p]$:

$$\hat{\theta}[p]=\hat{\theta}[m]+\hat{\omega}[p]\cdot(p-m)\cdot T_{ISR}$$

along with the elapsed time $(p-m)\cdot T_{ISR}$ and the angular position $\hat{\theta}[m]$ estimate in the retrieved state estimates for period m (i.e., value angle_rad shown in FIG. 5).

In this implementation, the timestamp values m, p are the contents of digital counter 52 at the corresponding times. As such, for the case in which counter 52 increments its contents as it is clocked, the above expression presumes that timestamp p is greater than timestamp m, since the sampling period of timestamp p is later in time than the period of timestamp m. However, digital counters wrap around their contents when full; as a result, a later sampling period may have a lower-valued timestamp than a previous period, if a wrap-around of counter 52 occurred in the intervening time so that its contents indicate an earlier count than that of the retrieved timestamp. According to this embodiment, therefore, process 64 accounts for the possibility that counter 52 may wrap around between sampling period p and sampling period m in its calculation of the updated angular velocity estimate $\hat{\omega}[p]$. For example, the software routine executed by processor unit 22 in process 64 may include a code block:

if (p<m):

Δcnt=(p−m)+maxCounterValue else:

Δcnt=(p−m)

where maxCounterValue is the maximum value storable by counter 52. The expression for the updated angular velocity estimate would be modified in this implementation to:

$\hat{\omega}[p]=\hat{\omega}[m]+\hat{\alpha}[m]\cdot\Delta cnt\cdot T_{ISR}$

Similarly, process 64 calculates an updated angular position $\hat{\theta}[p]$ estimate for sampling period p by using the updated estimate for angular velocity $\hat{\omega}[p]$:

$\hat{\theta}[p]=\hat{\theta}[m]+\hat{\omega}[p]\cdot\Delta cnt\cdot T_{ISR}$ along with the angular position $\hat{\theta}[m]$ estimate for previous sample m. As will be recognized by those skilled in the art, if counter 52 is a count-down counter, the code for handling the wrap around situation (i.e., the current contents of counter 52 indicating an earlier count than the timestamp value) will be modified accordingly.

The calculation of updated estimates in process 64 of control task CTRL can be further facilitated in those instances in which the angular velocity is constant, and thus in which the angular acceleration is zero. In that case, the updating of the state estimates in process 64 would necessitate only the update of the angular velocity estimate $\hat{\omega}[p]$:

$\hat{\theta}[p]=\hat{\theta}[m]+\hat{\omega}[m]\cdot\Delta cnt\cdot T_{ISR}$ because angular velocity $\hat{\omega}[p]$ equals angular velocity $\hat{\omega}[m]$ under zero angular acceleration. These updated state estimates for angular position and velocity are then applied, along with the corresponding sample data acquired in the current sampling period (e.g., Id, Iq) to produce the control signals to be applied to motor M.

Alternatively, it is contemplated that higher order calculations (e.g., by estimating jerk, and similarly calculating an updated acceleration estimate over one or more sampling periods) may be used in updating process 64. In addition, it is contemplated that other state estimates besides those directed to rotor position, velocity, and acceleration may also be updated in process 84, particularly if those estimates are useful in the control task CTRL.

In any case, once the rotor position and velocity, as well as other desired state estimates, are updated in process 64, control task CTRL continues with processes 66, 68 in which the multiphase control signals are generated using those updated state estimates. In process 66, the motor control functions of speed controller 30, PI controllers 34q, 34d, inverse Park transform 35, and space-vector generator 37 (FIG. 3) are executed (these functions being implemented in software in this implementation) to generate multiphase control signals Tabc that are written to PWM drivers 8 in the conventional manner, in process 68. PWM drivers 8 then, in turn, apply the appropriate pulse-width-modulated control signals to power drivers 9, which drive motor M via inverter 11 as described above relative to FIG. 2.

According to this embodiment, it is contemplated that the processing of interrupts according to this priority will continue within the current sampling period, with an idle state entered if all interrupts received have been handled before the end of the period. If a task is being executed at the end of the period, for example as in the case of the second instance of estimation task EST in sampling period n of FIG. 4, it is contemplated that the appropriate multi-tasking scheduling operations such as context switching and the like will be executed by MCU 20 in the conventional manner, as known in the art for multi-tasking processors and architectures. Operation in a similar manner then repeats in the next sampling period, and so on during the controlled operation of motor M.

Referring back to FIG. 4, the instance of the control task CTRL being executed in sampling period n thus uses the estimator output data calculated from the input data sample acquired in sample period n−2, updated in process 64 of control task CTRL to account for the latency between sampling period n−2 and the current period n, along with the appropriate input data (e.g., Iq, Id) acquired in sampling period n itself to produce the multiphase control signals to drive motor M in the next period n+1. Also within this sampling period n, estimation task EST is executed on the input data sample acquired in sampling period n−1, as that input data sample is the oldest sample for which state estimates have not been calculated, resulting in corresponding estimator output data for the input data sample of sampling period n−1. Because time remains in sampling period n following completion of that instance of estimation task EST, and because the input data sample for sampling period n has been acquired and stored, a second instance of estimation task EST on that input data sample begins execution in sampling period n, and is partially completed at the end of that period. In sampling period n+1, control task CTRL is executed using the estimator output data for the input data acquired in sampling period n−1 (i.e., the most recent state estimation data), followed by the completion of estimation task EST the input data sample acquired in sampling period n, which is followed by execution (to completion) of another instance of estimation task EST on the input data sample acquired and stored in sampling period n+1. Because estimator output data are obtained on the input data sample acquired in sampling period n+1, these estimator output data (n+1) are available for use in the next instance of control task CTRL in sampling period n+2. Because of the timing of the state estimations in this example, estimator output data calculated from the input data sample acquired in sampling period n are never directly used in the control loop. Operation of speed/position estimator function 48 of MCU 20 in this embodiment thus continues in this manner.

While the embodiment described above operates with an interrupt service routine (ISR) period that corresponds to the sampling period at which input data are acquired by ADCs 14, and to the control period at which motor control functions are performed and applied, it is contemplated that these periods may differ from one another. In particular, it is contemplated that motor control may also operate asynchronously from the acquiring of input data (i.e., the control period may differ from the sampling period), just as the state estimation operates asynchronously from the sampling period and the control period in the manner described above. It is contemplated that those skilled in the art having reference to this specification will be readily able to realize this alternative approach, as well as other alternatives and variations, without undue experimentation.

This embodiment contemplates that control task CTRL need not necessarily be performed in each sampling period. For example, MCU 20 may be operated so as to merely observe the rotation of motor M by acquiring input data samples in each sampling period and generating state estimates from those input data as execution time permits, without actively controlling it (i.e., without executing control tasks CTRL). The state estimates and their corresponding timestamp values obtained during such observation may be stored in memory for later analysis. Such observation without control may be useful in some situations. For example, during a start-up sequence in which the rotor is initially rotating prior to active control, observation of this motor can allow MCU 20 to obtain a velocity profile for the motor, from which the motor control algorithm can be smoothly applied to initiate active control, and to optimize the manner in which control is applied once initiated. Observation without control of the motor may also be useful to confirm an assumption that the rotor is spinning at a constant angular velocity, for example by observing the motor over a minimum estimation period to determine how constant the motor speed remains. This type of observation may also be useful in test and characterization systems, such as to measure the response of a motor design.

It is contemplated that the scheduling and execution of the state estimation function may be carried out in ways other than by interrupt handling and processing as described above for this embodiment. Such alternative hardware and software implementations are contemplated to be apparent to those skilled in the art having reference to this specification, and implementable in a corresponding system without undue experimentation. In any case, according to these embodiments, it is contemplated that the state estimation function is executed asynchronously with the control function, as it is essential for the control function to be performed timely and periodically, especially for control of modern fast response motors, while according to these embodiments, the state estimation function need not be completed within each sample period.

The asynchronous operation of state estimation relative to the control loop, in motor control systems according to these embodiments, provides one or more important advantages over conventional systems. One such advantage provided by this asynchronous operation is the ability to carry out state estimation and field-oriented control as tasks in a real-time operating system, indeed at different frequencies from one another, while still ensuring accurate angular position and velocity estimates as necessary for accurate motor control. This separation and RTOS implementation also allows for the use of a co-processor (e.g., estimator co-processor 23 of FIG. 2) to execute the state estimates, while the main processor (e.g., processor unit 22) can utilize its computational capacity for the control tasks. As a result, the sample rate at which sensor data can be acquired from the motor, and control signals applied to the motor based on those sensor data, can be increased without being limited by the computational time required for state estimation. This configuration enables the same motor control system to operate on a wider range of motors, including modern fast response motors.

While one or more embodiments have been described in this specification, it is of course contemplated that modifications of, and alternatives to, these embodiments, such modifications and alternatives capable of obtaining one or more of the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of controlling the operation of a multiphase AC electric motor, comprising:
periodically sensing electrical parameters corresponding to rotation of the motor;
storing, in a memory, input data corresponding to the sensed electrical parameters in association with a timestamp corresponding to a sampling period; and
within each of a plurality of sampling periods, performing a plurality of operations comprising:
executing a state estimation task comprising the operations of:
retrieving input data for a sampling period from the memory;
executing a state estimation algorithm to estimate at least one motor state from the retrieved input data; and
storing, in the memory, estimator output data corresponding to the estimated at least one motor state in association with the timestamp of the retrieved input data;
wherein the plurality of operations performed within each of the plurality of sampling periods further comprises:
executing a control task comprising the operations of:
retrieving, from the memory, most recent estimator output data indicating at least one state of the motor at a previous sampling period; and
updating a rotor position and a rotor velocity for the motor at a next sampling period from the most recent estimator output data; and
wherein the step of executing the state estimation function is performed responsive to completion of executing the control task within a sampling period.

2. The method of claim 1, wherein the plurality of operations performed within each of a plurality of sampling periods further comprises:
executing a command task comprising the operations of:
receiving a command;
responsive to completion of executing the control task within a sampling period, executing a command sequence responsive to the received command;
wherein the operation of executing the state estimation function is performed responsive to completion of both the executing of the control task and the executing of the command task within a sampling period.

3. The method of claim 1, further comprising:
within each of the plurality of sampling periods and responsive to the updated rotor position and rotor velocity, generating multiphase drive signals for application to the motor.

4. The method of claim 3, further comprising:
transforming the sensed electrical parameters into direct and quadrature phase feedback signals, the stored input data comprising data corresponding to the direct and quadrature phase feedback signals;
wherein the step of generating multiphase drive signals for application to the motor comprises:
generating direct and quadrature phase control signals responsive to a comparison of the direct and quadrature phase feedback signals to reference signals, and responsive to the updated rotor position and rotor velocity; and
generating the multiphase drive signals responsive to the direct and quadrature phase control signals.

5. The method of claim 1, wherein the updating operation comprises:
determining an elapsed time between a current sampling period and the sampling period indicated by the timestamp in the retrieved most recent estimator output data;

calculating an updated angular velocity estimate from the determined elapsed time and an angular velocity estimate in the retrieved most recent estimator output data; and calculating an updated angular position estimate from the updated angular velocity estimate and an angular position estimate in the retrieved most recent estimator output data.

6. The method of claim 5, wherein the timestamp stored in association with the input data and estimator output data comprises the contents of a counter at a time in the sampling period in which the input data are stored;

and wherein the step of determining the elapsed time comprises:
comparing current contents of the counter at a time in the current sampling period to the timestamp in the retrieved most recent estimator output data;
responsive to the current contents of the counter indicating a later count than the timestamp, calculating a count value from the difference between the current contents of the counter and the timestamp; and
responsive to the current contents of the counter indicating an earlier count than the timestamp, calculating a count value from the difference between the current contents of the counter and the timestamp plus a maximum counter value for the counter.

7. A controller for a multiphase electric motor, comprising:
control circuitry, for generating a direct phase control signal and a quadrature phase control signal responsive to at least one input signal and to a rotor velocity estimate signal;
a transform function, for generating output drive signals for a plurality of phases of the motor, responsive to the direct phase and quadrature phase control signals, and to a rotor position estimate signal;
feedback circuitry, for producing the direct and quadrature phase metric signals for a first sample period responsive to electrical values received from at least one sensor at the motor;
data memory; and
a speed/position estimator function, for generating the rotor velocity estimate signal and the rotor position estimate signal, by executing program instructions that, when executed, cause a processor to perform, within each of a plurality of sampling periods, a plurality of operations comprising:
storing, in the data memory, an input data sample corresponding to the electrical values received from the at least one sensor, in association with a timestamp corresponding to the sampling period;
executing a control task comprising the operations of:
retrieving, from the data memory, most recent estimator output data indicating at least one state of the motor at a previous sampling period; and
updating a rotor position and a rotor velocity for the motor at a next sampling period from the most recent estimator output data; and
responsive to completion of executing the control task within a sampling period, executing a state estimation task comprising the operations of:
retrieving input data for a sampling period from the data memory;
executing a state estimation algorithm to estimate at least one motor state from the retrieved input data; and storing, in the data memory, estimator output data corresponding to the estimated at least one motor state in association with the timestamp of the retrieved input data.

8. The controller of claim 7, wherein the plurality of operations further comprises:
executing a command task comprising the operations of:
receiving a command;
responsive to completion of executing the control task within a sample period, executing a command sequence responsive to the received command;
wherein the operation of executing the state estimation function is performed responsive to completion of both the executing of the control task and the executing of the command task within a sampling period.

9. The controller of claim 7, further comprising:
an interrupt handler function, receiving interrupts corresponding to the control task, command task, and state estimation task, the interrupt handler function for scheduling execution of tasks by the speed/position estimator function according to a priority scheme in which the control task has a higher priority than the state estimation task.

10. The controller of claim 7, wherein the updating operation comprises:
determining an elapsed time between a current sampling period and the sampling period indicated by the timestamp in the retrieved most recent estimator output data;
calculating an updated angular velocity estimate from the determined elapsed time and an angular velocity estimate in the retrieved most recent estimator output data; and
calculating an updated angular position estimate from the updated angular velocity estimate and an angular position estimate in the retrieved most recent estimator output data.

11. The controller of claim 10, further comprising:
a counter storing a value that is advanced responsive to a clock signal, the counter having a maximum value that, responsive to the clock signal, wraps around to a minimum value;
wherein the timestamp stored in association with the input data and estimator output data comprises the value in the digital counter at a time in the sampling period in which the input data are stored;
and wherein the step of determining the elapsed time comprises:
comparing a current value in the digital counter at a time in the current sampling period to the timestamp in the retrieved most recent estimator output data;
responsive to the current value being greater than the timestamp, calculating a count value from the difference between the current value and the timestamp; and
responsive to the current value being less than the timestamp, calculating a count value from the difference between the current value and the timestamp plus the maximum value.

12. The controller of claim 7, wherein the speed/position estimator function is comprised by:
a programmable processor unit; and
program memory storing the program instructions.

13. The controller of claim 12, wherein the programmable processor unit performs the step of executing the control task;
and wherein the speed/position estimator function is further comprised by:

an estimator co-processor, coupled to the programmable processor unit, for executing the state estimation task.

14. A method of controlling the operation of a multiphase AC electric motor, comprising:
periodically sensing electrical parameters corresponding to rotation of the motor; and
within each of a plurality of sampling periods, performing a plurality of operations comprising:
storing, in a memory, input data corresponding to the sensed electrical parameters in association with a timestamp corresponding to the sampling period;
responsive to receiving an interrupt corresponding to a control task within a sampling period, executing the control task by performing a plurality of operations comprising:
retrieving, from the data memory, most recent estimator output data indicating at least one state of the motor at a previous sampling period; and
updating a rotor position and a rotor velocity for the motor at a next sampling period from the most recent estimator output data; and
responsive to receiving an interrupt corresponding to a state estimation task within a sampling period, and responsive to any control task for that sampling period having completed, executing the state estimation task by performing a plurality of operations comprising the operations of:
retrieving input data for the sampling period from the memory;
executing a state estimation algorithm to estimate at least one motor state from the retrieved input data; and
storing, in the memory, estimator output data corresponding to the estimated at least one motor state in association with the timestamp of the retrieved input data.

15. The method of claim 14, further comprising:
responsive to receiving an interrupt corresponding to a command within a sampling period, and responsive to any control task for that sampling period having completed, executing a command task responsive to the received command;
wherein the executing the state estimation task is performed also responsive to any control task, for that sampling period and of higher priority than the state estimation task, having completed.

16. The method of claim 14, further comprising:
within each of the plurality of sampling periods and responsive to the updated rotor position and rotor velocity, generating multiphase drive signals for application to the motor.

17. The method of claim 14, wherein the updating operation comprises:
determining an elapsed time between a current sampling period and the sampling period indicated by the timestamp in the retrieved most recent estimator output data;
calculating an updated angular velocity estimate from the determined elapsed time and an angular velocity estimate in the retrieved most recent estimator output data; and
calculating an updated angular position estimate from the updated angular velocity estimate and an angular position estimate in the retrieved most recent estimator output data.

* * * * *